US008238635B2

(12) United States Patent
Can et al.

(10) Patent No.: US 8,238,635 B2
(45) Date of Patent: Aug. 7, 2012

(54) METHOD AND SYSTEM FOR IDENTIFYING DEFECTS IN RADIOGRAPHIC IMAGE DATA CORRESPONDING TO A SCANNED OBJECT

(75) Inventors: Ali Can, Troy, NY (US); Robert August Kaucic, Niskayuna, NY (US); Paulo Ricardo Mendonca, Clifton Park, NY (US); Zhaohui Sun, Niskayuna, NY (US); Joseph Manuel Portaz, Hamilton, OH (US)

(73) Assignee: General Electric Company, Niskayuna, NY (US)

( * ) Notice: Subject to any disclaimer, the term of this patent is extended or adjusted under 35 U.S.C. 154(b) by 1174 days.

(21) Appl. No.: 12/052,943

(22) Filed: Mar. 21, 2008

(65) Prior Publication Data

US 2009/0238432 A1 Sep. 24, 2009

(51) Int. Cl.
*G06K 9/00* (2006.01)
(52) U.S. Cl. ........ 382/131; 382/132; 382/141; 382/149; 378/58
(58) Field of Classification Search .................. 382/131, 382/132, 149, 141; 378/58
See application file for complete search history.

(56) References Cited

U.S. PATENT DOCUMENTS

| | | | | | |
|---|---|---|---|---|---|
| 4,803,639 | A | * | 2/1989 | Steele et al. ............... 702/40 |
| 4,941,164 | A | * | 7/1990 | Schuller et al. ............... 378/205 |
| 5,537,669 | A | * | 7/1996 | Evans et al. ............... 382/141 |
| 5,640,200 | A | * | 6/1997 | Michael ............... 348/87 |
| 5,732,121 | A | * | 3/1998 | Takeo et al. ............... 378/62 |
| 5,774,521 | A | * | 6/1998 | Close et al. ............... 378/62 |
| 6,005,977 | A | * | 12/1999 | Tanimizu et al. ............ 382/216 |
| 6,333,991 | B1 | | 12/2001 | Schreiber et al. |
| 6,393,095 | B1 | | 5/2002 | Robinson |
| 6,539,106 | B1 | * | 3/2003 | Gallarda et al. ............ 382/149 |
| 6,658,145 | B1 | * | 12/2003 | Silver et al. ............ 382/149 |
| 6,687,328 | B2 | | 2/2004 | Bavendiek et al. |
| 6,748,112 | B1 | * | 6/2004 | Nguyen et al. ............ 382/203 |
| 6,895,073 | B2 | | 5/2005 | Shih et al. |
| 7,065,176 | B2 | | 6/2006 | Moermond et al. |
| 7,272,254 | B2 | | 9/2007 | Shankarappa et al. |
| 7,450,780 | B2 | * | 11/2008 | Roche et al. ............ 382/276 |
| 8,131,107 | B2 | * | 3/2012 | Sun et al. ............ 382/272 |
| 2002/0118893 | A1 | * | 8/2002 | Nguyen et al. ............ 382/294 |
| 2002/0141626 | A1 | * | 10/2002 | Caspi ............ 382/131 |
| 2006/0126914 | A1 | * | 6/2006 | Ishikawa ............ 382/149 |

(Continued)

OTHER PUBLICATIONS

L. Fillatre et al., "A Simple Algorighm for Defect Detection From a Few Rediographies," Journal of Computers, vol. 2, No. 6, Aug. 2007, pp. 26-34.

(Continued)

*Primary Examiner* — Edward Glick
*Assistant Examiner* — Alexander H Taningco
(74) *Attorney, Agent, or Firm* — Penny A. Clarke

(57) ABSTRACT

A method for identifying defects in radiographic image data corresponding to a scanned object is provided. The method includes acquiring radiographic image data corresponding to a scanned object. In one embodiment, the radiographic image data includes an inspection test image and a reference image corresponding to the scanned object. The method includes identifying one or more regions of interest in the reference image and aligning the inspection test image with the regions of interest identified in the reference image, to obtain a residual image. The method further includes identifying one or more defects in the inspection test image based upon the residual image and one or more defect probability values computed for one or more pixels in the residual image.

21 Claims, 3 Drawing Sheets

U.S. PATENT DOCUMENTS

| | | | |
|---|---|---|---|
| 2006/0243410 A1 | 11/2006 | Herold | |
| 2006/0245542 A1 | 11/2006 | Bavendiek et al. | |
| 2007/0009148 A1* | 1/2007 | Brasen et al. | 382/149 |
| 2008/0031511 A1* | 2/2008 | Sakai et al. | 382/149 |

OTHER PUBLICATIONS

D. Mery et al., "Processing Digital X-Ray Images and Its Applications in the Automated Visual Inspection of Aluminum Castings," 3rd Pan American Conference for Nondestructive Testing—PANNDT Rio de Janeiro, Jun. 2-7, 2003. pp. 1-14.

D. Mery et al., "Automatic Detection of Welding Defects Using Texture Features," International Symposium on Computed Tomography and Image Processing for Industrial Radiology, Berlin, Jun. 23-25, 2003, pp. 1-9.

D. Mery et al., "Pattern Recognition in the Automatic Inspection of Aluminum Castings," International Symposium on Computed Tomography and Image Processing for Industrial radiology, Berlin, Jun. 23-25, 2003, pp. 1-13.

D. Mery et al., "Automated Flaw Detection in Aluminum Castings Based on the Tracking of Potential Defects in a Radioscopic Image Sequence," IEEE Transactions on Robotic's and Automation, vol. 18, No. 6, Dec. 2002, pp. 890-901.

D. Mery et al., "A Review of Methods for Automated Recognition of Casting Defects," Insight (UK), vol. 44, No. 7, May 24, 2002, pp. 1-15.

V. Nguyen et al., "Exhaustive Detection of Manufacturing Flaws as Abnormalities," IEEE International Conference on Computer vision and pattern Recognition, Santa Barbara, California, 1998, pp. 945-952.

H. Boerner et al., "Automated X-Ray Inspection of Aluminum Castings," IEEE Transactions on Pattern Analysis Machine Intelligence, vol. 10, No. 1, Jan. 1988, pp. 79-91.

J. Mundy et al., "An Object-Oriented Approach to Template Guided Visual Inspection," IEEE International Conference on Computer Vision and Pattern Recognition, Champaign, IL., 1992, pp. 386-392.

J. Noble et al., "High Precision X-Ray Stereo for Automated 3-D Cad-Based Inspection," IEEE Transactions on Robotics and Automation, vol. 14, No. 2, Apr. 1998, pp. 292-302.

T. Parag et al., "A Framework for Feature Selection for Background Subtraction," IEEE International conference on Computer Vision and Pattern Recognition, New York, New York, 2006, pp. 1916-1923.

W. R. Scott et al., "View Planning for Automated Three-Dimensional Object Reconstruction and Inspection," ACM Computing Surveys, vol. 35, No. 1, Mar. 2003, vol. 35, No. 1, Mar. 2003, pp. 64-96.

C. Stauffer et al., "Learning Patterns of Activity Using Real-Time Tracking," IEEE Transactions on Pattern Analysis Machine Intelligence, vol. 22, No. 8, Aug. 2000, pp. 747-757.

Z. Sun et al., "Image Comparision by Compound Disjoint Information," IEEE Computer Society Conference on Computer Vision and Pattern Recognition, New York, New York, Jun. 2006, pp. 857-862.

P. viola et al., "Alignment by Maximization of Mutual Information," International Journal of Computer Vision, vol. 24, No. 2, 1997, pp. 137-154.

ITK Software Guide, http://www.itk.org/HTML/Download.htm//, The ITK Software Guide, 2nd Edition updated for ITK, Version 2.4, Nov. 21, 2005.

* cited by examiner

METHOD AND SYSTEM FOR IDENTIFYING DEFECTS IN RADIOGRAPHIC IMAGE DATA CORRESPONDING TO A SCANNED OBJECT

BACKGROUND

The invention relates generally to radiography and more particularly to a method and system for automatically identifying defects in radiographic image data corresponding to a scanned object.

Radiography is a technique of producing an image of any opaque object by the penetration of radiation, such as gamma rays, X-rays, neutrons, or charged particles. When a beam of radiation is transmitted through any object, the radiation is differentially absorbed depending upon variations in object thickness, density, and chemical composition. The energy emergent from the object forms a radiographic image, which may then be realized on an image detection medium, such as a radiation sensitive detector. The detector comprises an array of elements that records the number of incident photons at each element position, and maps the recording onto a two-dimensional (2D) image. The 2D image is then fed to a computer workstation and interpreted by trained personnel.

Radiography finds wide application in various medical and industrial applications as a non-destructive technique for examining the internal structure of an object. Non-destructive evaluation (NDE) of industrial parts is essential for manufacturing productivity and quality control. For example, in aerospace and automotive industries, radiographic images of aluminum castings are typically inspected by an operator who identifies defects pertaining to porosities, inclusions, shrinkages, cracks, etc. in the castings. However, and as will be appreciated by those skilled in the art, owing to the structural complexity and large production volumes of these castings, the manual inspection procedure is often prone to operator fatigue and hence suffers from low inspection reliability.

A number of radiographic inspection techniques such as feature-based classification, artificial neural networks and adaptive filtering have been developed to perform automatic radiographic inspections of scanned objects. These techniques are typically based on using assisted defect recognition (ADR) techniques to automatically screen images, call out defects and prioritize the ones needing visual inspection. As will be appreciated by those skilled in the art, ADR techniques typically achieve more accurate defect detectability than human operators and have a much higher efficiency and consistency, thereby enhancing quality control in a wide variety of applications, such as, for example, automotive parts and engine components of aircraft, ships and power generators. Techniques using ADR may typically be used to perform automatic defect detection on 2D images and/or 3D images, based on analyzing the geometry (e.g., shape, size), feature (e.g., intensity, texture, color) and other local image statistics in the radiographic image data, to locate abnormalities. For example, ADR techniques based on image features use a set of features to identify potential flaws in scanned object parts based on flaw morphology and gray level statistics. These techniques assign each pixel in the image into one of several classes based on minimizing a distance metric, wherein the parameters characterizing the distance metric are evaluated using a supervised learning scheme. However, the performance of these techniques is affected by variations caused by object structure or flaw morphology and these techniques generally require large training sets with labeled flaws to perform defect identification.

It would therefore be desirable to develop an efficient radiographic inspection technique for automatically detecting defects in radiographic image data corresponding to a scanned object. In addition, it would be desirable to develop an efficient radiographic inspection technique that detects anomalies in industrial parts, produces accurate defect detectability rates, increases the screening efficiency and consistency of inspection systems and efficiently utilizes system operation setup time and system training time.

BRIEF DESCRIPTION

In one embodiment, a method for identifying defects in radiographic image data corresponding to a scanned object is provided. The method includes acquiring radiographic image data corresponding to a scanned object. In one embodiment, the radiographic image data includes an inspection test image and a reference image corresponding to the scanned object. The method includes identifying one or more regions of interest in the reference image and aligning the inspection test image with the regions of interest identified in the reference image, to obtain a residual image. The method further includes identifying one or more defects in the inspection test image based upon the residual image and one or more defect probability values computed for one or more pixels in the residual image.

In another embodiment, a radiographic inspection system is provided. The system includes an imaging system configured to acquire radiographic image data corresponding to a scanned object. The system further includes a computer system configured to be in signal communication with the imaging system. The computer system includes a memory configured to store the radiographic image data corresponding to the scanned object. In one embodiment, the radiographic image data includes an inspection test image and a reference image corresponding to the scanned object. The computer system further includes a processor configured to process the radiographic image data corresponding to the scanned object. In one embodiment, the processor is configured to identify one or more regions of interest in the reference image, align the inspection test image with the regions of interest identified in the reference image, to obtain a residual image and identify one or more defects in the inspection test image based upon the residual image and one or more defect probability values computed for one or more pixels in the residual image. The computer system further includes a display device configured to display the defects in the radiographic image data corresponding to the scanned object.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
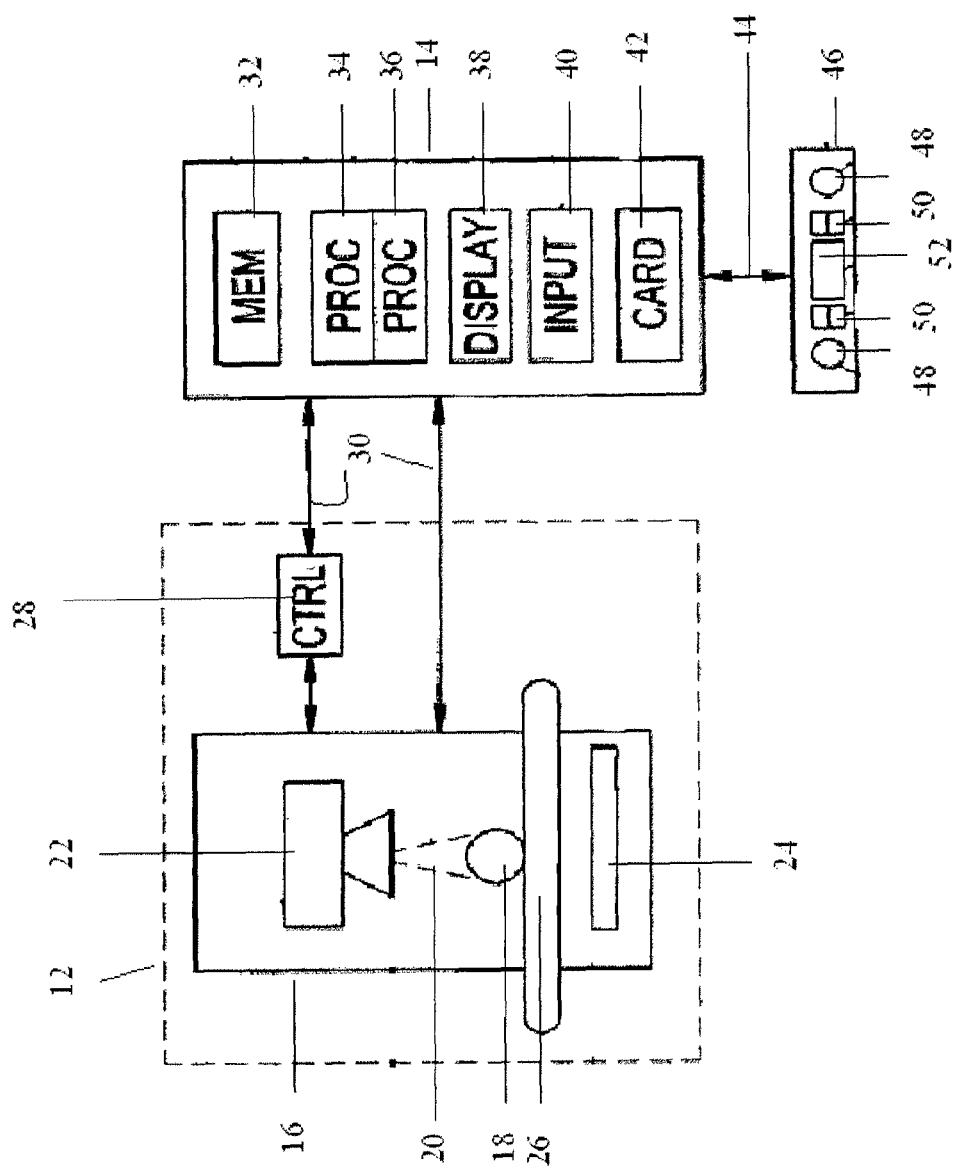
FIG. 1 is an illustration of an exemplary radiographic inspection system for processing a radiographic image of a scanned object.

FIG. 1 is an illustration of an exemplary radiographic inspection system for processing a radiographic image of a scanned object. Referring to FIG. 1, the radiographic inspection system 10 includes a computer system 14 adapted to be in signal communication with an imaging system 12 via a communication bus 30. A real-time image controller 46 is adapted to be in signal communication with the computer system 14 via another communication bus 44. The imaging system 12 is configured to acquire and output radiographic image data corresponding to a scanned object 18 via an imaging device 16. The imaging system may include, but is not limited to, an X-ray system and a CT system. In one embodiment, the imaging device 16 includes an X-ray source 22, an image detector 24 and an object manipulator 26. The imaging system 12 also includes an imaging system controller 28 that receives control commands from the computer system 14 and sends control signals to the various components of the imaging device 16. The object manipulator 26 may be a conveyor belt, a reversible table, or any other suitable device for manipulating the scanned object 18 into and out of the X-ray beam 20.

The computer system 14 includes a memory 32 configured to store the radiographic image data corresponding to the scanned object. In one embodiment and as will be described in greater detail below, the radiographic image data includes an inspection test image and a reference image corresponding to the scanned object. Further, the memory 32 may include, but is not limited to, any type and number of memory chip, magnetic storage disks, optical storage disks, mass storage devices, or any other storage device suitable for retaining information. The computer system 14 also includes one or more processors 34, 36 configured to process the radiographic image data corresponding to the scanned object. In one embodiment, and as will be described in greater detail below, the processor is further configured to identify one or more regions of interest in the reference image, align the inspection test image with the regions of interest identified in the reference image, to obtain a residual image and identify one or more defects in the inspection test image based upon the residual image and one or more defect probability values computed for one or more pixels in the residual image.

For the illustrated example shown in FIG. 1, the computer system 14 also includes a detector interface card 42, an input device 40 and a display device 38. The input device 40 may include, but is not limited to, a keyboard, a mouse, a pointing device, a touch sensitive screen device, a tablet, a read/write drive for a magnetic disk, a read/write drive for an optical disk, a read/write drive for any other input medium, an input port for a communication link (electrical or optical), a wireless receiver. The display device 38 may be a CRT (cathode ray tube) screen or any other suitable display device for displaying text, graphics and a graphical user interface, for example. In one embodiment, the display device is configured to display one or more defects in the radiographic image corresponding to the scanned object. The input device 40 and the display device 38 operate in combination to provide a graphical user interface, which enables a user or operator to configure and operate the radiographic inspection system 10. The detector interface card 42 provides low-level control over the image detector, buffers data read out from the image detector 24, and optionally reorders image pixels to convert from read-out order to display order. The real-time image controller 46 includes a set of image control buttons 50, a set of image control dials 48, a display 52, and an embedded application programming interface that maps the functions of the control buttons and dials 48, 50 to the computer system 14.

Figure 2:
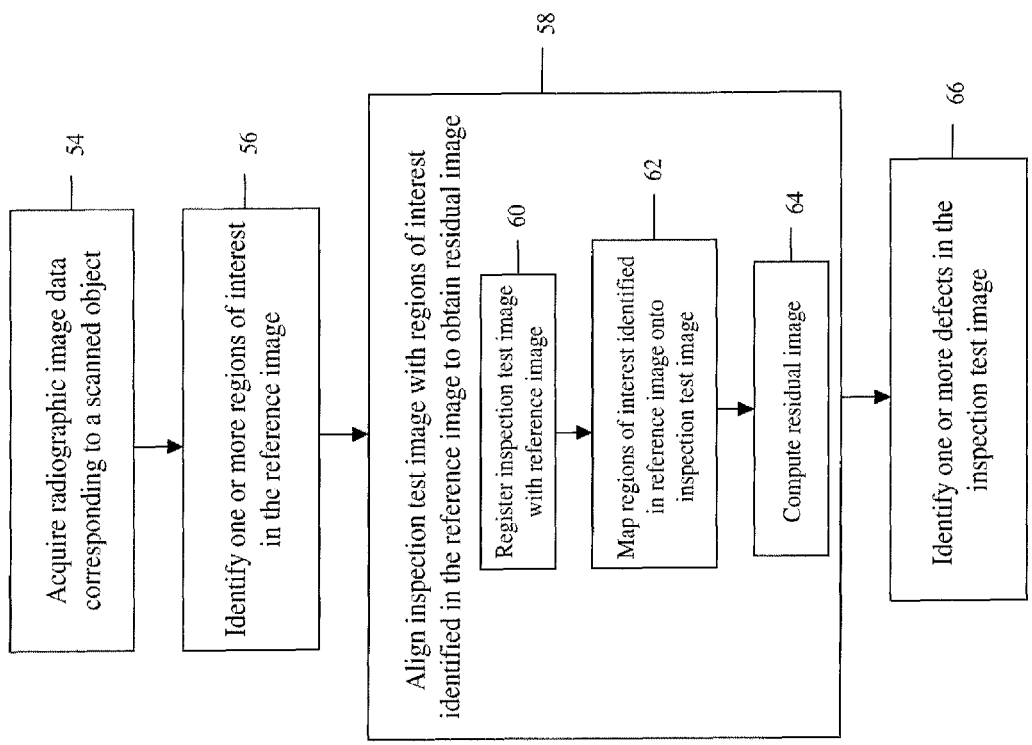
FIG. 2 is a flowchart illustrating exemplary steps for identifying defects in radiographic image data corresponding to a scanned object, in accordance with one embodiment of the present invention.

FIG. 2 is a flowchart illustrating exemplary steps for identifying defects in radiographic image data corresponding to a scanned object, in accordance with one embodiment of the present invention. Non-limiting examples of the scanned object include industrial parts, such as turbine engine components. Other examples of the scanned object include automotive parts such as cylinder heads, pumps, pump housings, piston heads, engine blocks and pistons. In addition, composite parts such as compressor blades, turbine shrouds, airplane winglets, etc. can be inspected using this technique. Examples of the defects include, but are not limited to, casting and/or manufacturing defects present in a scanned object. For example, manufacturing defects may include misdrills, mergers, overdrills, dwells, scarfs and extra materials present in aircraft engine parts.

Referring to FIG. 2 now, in step 54, radiographic image data corresponding to a scanned object is initially acquired, using, for example, a radiographic inspection system, such as, as described in FIG. 1. In one embodiment, the radiographic image data includes an inspection test image and a reference image corresponding to the scanned object. In a particular embodiment, the reference image includes one or more defect-free images of the industrial part acquired at a number of intermediate steps in a manufacturing process corresponding to the industrial part being scanned. For example, in one embodiment, the reference image may correspond to defect-free images of an aircraft engine part obtained before the cooling holes are drilled, wherein a typical step in the manufacturing process related to an aircraft engine part includes drilling cooling holes into the part. In other embodiments, reference images can be obtained prior to machining. Another illustrative example of a manufacturing step includes the machining of a part after casting. The defect-free images may then be averaged to obtain a noise-free reference image corresponding to the industrial part, in one embodiment.

In step 56, one or more regions of interest are identified in the reference image. In one embodiment, the regions of interest include, but are not limited to, a boundary region, a drilling region, a cavity region and a region with high attenuation in the reference image. In a particular embodiment, the regions of interest in the reference image are identified manually. The manual identification of the regions of interest, in accordance with embodiments of the present invention, enables the detection of defects in the radiographic image data corresponding to a scanned object based upon a user's prior knowledge of possible locations where defects may occur in the part being inspected.

In another embodiment of the present invention, the acquired reference image may further be processed to define one or more iso-contours on the reference image. As will be appreciated by those skilled in the art, iso-contours refer to interpolated pixel locations in an image that correspond to a fixed intensity value. In one embodiment, the iso-contours on the reference image are estimated using a technique based upon a fast marching squares algorithm with linear interpolation. As will be appreciated by those skilled in the art, this technique is based on a two-dimensional version of the marching cubes algorithm. This is an effective and efficient technique for the estimation of iso-contours, since all operations are local and based on a set of previously determined local contour templates which undergo local adjustments based on the intensity values on their vicinity. In a particular embodiment, local iso-contours passing through each pixel in the reference image, as a center of the local neighborhood, are computed. Specifically, for each pixel (x,y) on the reference image, the set of iso-contours in a circular neighborhood W with an iso-contour value of I(x, y) may be defined as follows:

$$C_i(x,y) = \{\forall (x',y') : (x-x')^2 + (y-y')^2 < W^2 \text{ and } I(x',y') = I(x,y)\} \quad (1)$$

wherein $C_i(x, y)$ denotes the subset of iso-contours that pass through the center pixel. As will be discussed in greater detail below, the iso-contours correspond to constant material thickness on the inspection part along an x-ray projection path. In one embodiment, iso-contours may be estimated on an un-drilled defect free reference image and may be used to detect defects in the radiographic image data corresponding to the scanned object based upon an estimation of the amount of material loss/gain in the inspection part. In another embodiment, the acquired reference image may also be processed to compute one or more local linear patches on the reference image. Liner patches in the reference image may be computed, for example by, model-based segmentation, in which an approximated pre-segmented part is matched against the reference image; linear patches in the pre-segmented part are mapped to the reference part through a mapping function. Examples of possible matching functions include affine or projective transformations.

In step 58, the inspection test image is aligned with the regions of interest identified in the reference image, to obtain a residual image. In one embodiment, the step 58 of aligning the inspection test image with the reference image includes a step 60 of registering the inspection test image with the reference image. In a particular embodiment, the image registration may be performed using one or more registration metrics known in the art, such as, for example, disjoint information, mutual information, mean squared error, normalized correlation and gradient difference. As will be appreciated by those skilled in the art, image registration typically includes finding the optimal geometric transform between two or more images that brings a moving image into spatial alignment with a fixed image. The geometric transform may be represented by different models such as, for example, translation, rotation, scaling, shear, rigid, similarity, affine, perspective piecewise affine and deformable models.

In a particular embodiment, the step 58 of aligning the inspection test image with the reference image to obtain the residual image further includes a step 62 of mapping the regions of interest identified in the reference image onto the inspection test image. Specifically, an image registration of each of the mapped regions of interest in the inspection test image is performed by superimposing all the contour information and the region of interest information onto the inspection test image and fine-tuning the registration for each of the regions of interest. In step 64, a residual image is computed. In one embodiment, the residual image represents a material loss and/or a material gain in the reference image and the registered test image and may be used to identify and classify defects in the inspection test image, as will be discussed in greater detail below. In one embodiment, the step 64 of computing a residual image includes generating a normalized transformed inspection test image obtained by normalizing one or more pixel intensity values in the inspection test image with respect to one or more pixel intensity values in the reference image. The normalized transformed inspection test image is then subtracted from the reference image to obtain the residual image. Accordingly, in one embodiment, the residual image may be computed by normalizing the intensity values of the reference image and fine-tuning the registration of each of the regions of interest in the reference image and then subtracting the registered inspection test image from the reference image to compute the residual image.

In another embodiment, the residual image may also be computed using mapped contour information as discussed above, by performing morphological closing operations formed on the contours to estimate iso-contour intensity values in the reference image. As will be appreciated by those skilled in the art, iso-contours on an image correspond to constant material thickness on an inspection part along an x-ray projection path. In one embodiment, the inspection test image is registered and mapped to the reference coordinate system and all the iso-contours defined in the reference image are superimposed onto the inspection test image. Accordingly, constant thickness profiles may be determined, even in the presence of defects, shot-peens or drills. In a particular embodiment, the mapped iso-contours may be used to estimate the defect-free, drill-free material thickness profile and a residual image may be computed by subtracting the width profile value from the inspection test image observations. In another embodiment, the residual image may also be computed by modeling the reference image using local linear patches. The local patches may be superimposed onto the mapped inspection image and patch parameters may be computed and updated by robust fitting techniques and the difference between the updated patch values and the mapped inspection test image may be used to compute the residual image.

In step 66, one or more defects in the inspection test image are identified based upon the residual image. In one embodiment, the step 66 of identifying one or more defects in the inspection test image includes computing one or more defect probability values for one or more pixels in the residual image. In a particular embodiment, the step 66 of identifying one or more defects in the inspection test image further includes computing one or more defect probability values for one or more pixels in the reference image. Specifically, in one embodiment, one or more cumulative distribution function (CDF) values are computed for one or more pixels in the reference image and the residual image. In a particular example, the CDF values are computed based upon computing a probability density function (PDF) for each pixel at a particular pixel location in the reference image and the residual image. In a particular embodiment, the PDF for each pixel may be computed as a function of a defect probability of a pixel at a particular pixel location and a defect prior term. For example, the PDF for a pixel may be computed as shown in equation (2) below:

$$p(y/x) \propto p(x/y) * p(y) \quad (2)$$

wherein $p(y/x)$ represents the PDF computed for each pixel, $p(x/y)$ is a likelihood term that represents the defect probability of a pixel at a particular pixel location and $p(y)$ represents the prior term for a given a set of image features x, and an image state, y. In one embodiment, and as shown in equation (2), the PDF $p(y/x)$ computed for each pixel is proportional to the product of the likelihood term $p(x/y)$ and the prior term $p(y)$. In one embodiment, the image features may include, for example, image intensity, texture and/or color and the image state y may include, for example, whether a pixel (or region) is normal or potentially abnormal, that is, possibly a defect. More particularly, the image state y may include, for example, historical data on the probability of the occurrence of a defect at a given pixel location, or physical models for the effect of a defect on the probability distribution of the features x. Further, in one embodiment, the prior term $p(y)$ is used to detect anomalies in the industrial part, based upon domain and/or prior knowledge of the industrial part.

Figure 3:
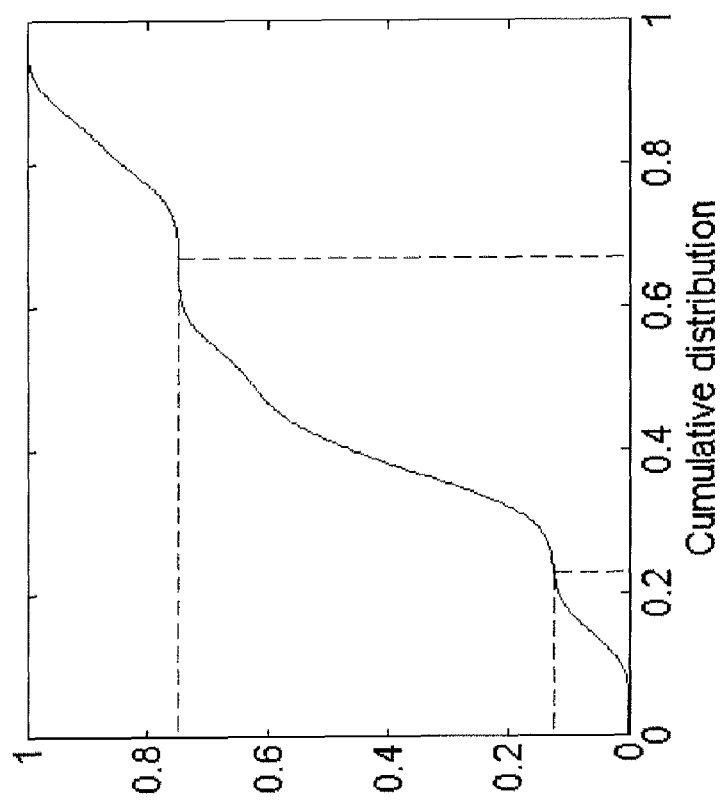
FIG. 3 is a graph illustrating cumulative density function (CDF) values plotted for one or more pixels at one or more pixel locations.

FIG. 3 is a graph illustrating cumulative density function (CDF) values plotted for one or more pixels at one or more pixel locations. In one embodiment, the cumulative density function (CDF) may be evaluated as shown by equation (3) below:

$$P(y/x) = \int_{-\infty}^{y} p(t/x)\,dt \quad (7)$$

Referring again to step 66 in FIG. 2, a defect-probability type for each pixel in the residual image is computed based upon the CDF values computed for the pixels in the reference image. In one embodiment, the defect-probability type corresponds to at least one of a material loss defect or a material gain defect in the residual image. Specifically, the defect-probability type for each pixel in the residual image is determined by comparing the CDF values derived for each pixel in the residual image to the CDF values derived for the pixels in the reference image.

One or more defective pixels in the inspection test image are then identified based upon the CDF values derived for each pixel in the residual image. In one embodiment, the CDF values derived for each pixel in the residual image are compared to a defect probability threshold, a defect size and one or more prior domain constraints, wherein pixels having defect probability threshold values above the defect probability threshold and pixels present within a region of interest of a particular size in the inspection test image, are classified as defective pixels. Referring again to the graph illustrated in FIG. 3, if the CDF for a pixel, i.e., P(y/x), is greater than or below the defect probability threshold, then the pixel is identified as a defective pixel. As illustrated in the graph shown in FIG. 3, in a particular example, pixels with a CDF of over 0.68 defined as potential excess material defects and pixels with a CDF below 0.68 are defined as potential negative material defects.

In accordance with another embodiment of the present invention, a region analysis procedure may further be performed to alleviate incidental detection due to noisy image data, image misalignment and image appearance change. For example, in one embodiment, a region analysis procedure may be performed to identify the potential defective pixels in the inspection test image, wherein pixels that are present within regions that are larger than a particular size are confirmed as defective pixels.

In a particular embodiment, a connected component analysis may be performed to identify the potential defective pixels. As will be appreciated by those skilled in the art, a connected component analysis includes scanning the pixels of an image and associating to adjacent pixels that satisfy one or more conditions a given label associated with the satisfied condition. More particularly, a connected component analysis includes comparing the similarity between neighboring pixels, where in different 2D embodiments neighboring pixels can be 4 or 8 connected and in 3D embodiments neighboring pixels can be 6 or 27-connected or other neighborhood structures, and then grouping similar neighboring pixels.

Embodiments of the present invention disclose a technique for identifying defects in radiographic image data corresponding to a scanned object, by identifying regions of interest in the radiographic image data based upon an expert's prior knowledge of defective locations in an inspection part, and further identifying defects in the radiographic image data based upon computing a residual image and one or more defect probability values, wherein the residual image and the defect probability values further enable the identification of defects caused due to excess material from the defects caused due to missing material in the radiographic image data corresponding to the scanned object. The disclosed technique is efficient, produces accurate defect detectability rates and efficiently utilizes system operation time and system training time. Further, the disclosed technique increases screening efficiency and consistency of inspection systems by filtering out the defect-free images and prioritizing the images needing visual inspection, thereby increasing throughput and efficiency.

In addition, the disclosed technique for detecting defects may be applied to multiple observations corresponding to multiple images of the scanned object acquired at one or more view angles. Furthermore, the disclosed technique can be applied to defect-free three-dimensional (3D) volumes to evaluate an inspection test volume for potential defect indications. Further, the disclosed statistical modeling approach can be combined with a Computer Aided Design (CAD) model to enable the detection of defects in the radiographic image data corresponding to the scanned object with greater accuracy.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for identifying defects in radiographic image data corresponding to a scanned object, the method comprising:
   acquiring radiographic image data corresponding to a scanned object, wherein the radiographic image data comprises at least one of an inspection test image and a reference image corresponding to the scanned object;
   identifying one or more regions of interest in the reference image;
   aligning the inspection test image with the one or more regions of interest identified in the reference image, to obtain a residual image;
   identifying one or more defects in the inspection test image based upon at least one of the residual image and one or more defect probability values computed for one or more pixels in the residual image, wherein the step of identifying the one or more defects in the inspection test image based upon the one or more defect probability values further comprises computing one or more cumulative distribution function (CDF) values for one or more pixels in the reference image and the residual image; and
   computing a probability density function (PDF) for each pixel in the reference image and the residual image based upon the CDF values computed for the one or more pixels in the reference image, wherein the PDF for each pixel is computed as a function of a defect probability of a pixel at a particular pixel location and a defect prior term.

2. The method of claim 1, wherein the scanned object comprises one or more industrial parts.

3. The method of claim 2, wherein the reference image comprises one or more defect-free images corresponding to the industrial part, and wherein the defect-free images of the industrial part are acquired at a plurality of intermediate steps in a manufacturing process corresponding to the industrial part.

4. The method of claim 3, further comprising averaging the one or more defect-free images, to obtain a noise-free reference image corresponding to the industrial part.

5. The method of claim 1, wherein the one or more regions of interest comprise at least one of a boundary region, a drilling region, a cavity region and a region with high attenuation in the reference image.

6. The method of claim 1, wherein the step of identifying the one or more regions of interest in the reference image is performed manually.

7. The method of claim 1, wherein the step of aligning the inspection test image with the reference image to obtain the residual image comprises registering the inspection test image with the reference image.

8. The method of claim 7, wherein the image registration is performed using one or more registration metrics selected from the group consisting of disjoint information, mutual information, mean squared error, normalized correlation and gradient difference.

9. The method of claim 7, further comprising mapping the one or more regions of interest identified in the reference image onto the inspection test image, and performing an image registration of each of the mapped regions of interest in the inspection test image.

10. The method of claim 9, further comprising a normalization step, wherein the step of normalization comprises generating a normalized transformed inspection test image obtained by normalizing one or more pixel intensity values in the inspection test image with respect to one or more pixel intensity values in the reference image.

11. The method of claim 10, further comprising subtracting the normalized transformed inspection test image from the reference image to obtain the residual image.

12. The method of claim 7, further comprising processing the reference image to define one or more iso-contours on the reference image, wherein the residual image is further computed based upon the iso-contours defined in the reference image.

13. The method of claim 7, further comprising processing the reference image to define one or more linear patches on the reference image, wherein the residual image is further computed based upon the linear patches defined in the reference image.

14. The method of claim 7, wherein the residual image represents at least one of a material loss or a material gain in the reference image and the registered inspection test image, corresponding to the scanned object.

15. The method of claim 1, wherein the defect-probability type corresponds to at least one of a material loss defect or a material gain defect in the residual image.

16. The method of claim 1, further comprising identifying one or more defective pixels in the inspection test image, based upon the CDF values derived for each pixel in the residual image.

17. The method of claim 16, wherein the one or more defective pixels are identified in the inspection test image based upon a comparison of the CDF derived for each pixel in the residual image and at least one of a defect probability threshold, a defect size and one or more prior domain constraints.

18. The method of claim 17, further comprising identifying one or more defective regions of interest in the inspection test image based upon identifying one or more of the defective pixels that form a region of interest of a particular size in the inspection test image.

19. The method of claim 1, wherein the one or more defects comprise at least one of casting defects and manufacturing defects corresponding to the scanned object.

20. The method of claim 19, wherein the casting defects and the manufacturing defects comprise at least one of misdrills, mergers, overdrills, dwells, scarfs in the scanned object.

21. A radiographic inspection system comprising:
an imaging system configured to acquire radiographic image data corresponding to a scanned object; and
a computer system configured to be in signal communication with the imaging system, wherein the computer system comprises:
a memory configured to store the radiographic image data corresponding to the scanned object, wherein the radiographic image data comprises at least one of an inspection test image and a reference image corresponding to the scanned object;
a processor configured to:
process the radiographic image data corresponding to the scanned object,
identify one or more regions of interest in the reference image; align the inspection test image with the one or more regions of interest identified in the reference image, to obtain a residual image,
identify one or more defects in the inspection test image based upon at least one of the residual image and one or more defect probability values computed for one or more pixels in the residual image, wherein the defect identification further comprises computing one or more cumulative distribution function (CDF) values for one or more pixels in the reference image and the residual image, and
compute a probability density function (PDF) for each pixel in the reference image and the residual image based upon the CDF values computed for the one or more pixels in the reference image, wherein the PDF for each pixel is computed as a function of a defect probability of a pixel at a particular pixel location and a defect prior term; and
a display device configured to display the one or more defects in the radiographic image data corresponding to the scanned object.

* * * * *